(12) United States Patent
Cloute et al.

(10) Patent No.: US 11,593,289 B2
(45) Date of Patent: Feb. 28, 2023

(54) DIRECT MEMORY ACCESS

(71) Applicants: STMicroelectronics (Grenoble 2) SAS, Grenoble (FR); STMicroelectronics (Rousset) SAS, Rousset (FR)

(72) Inventors: François Cloute, Coublevie (FR); Sandrine Lendre, Pourrières (FR)

(73) Assignees: STMicroelectronics (Grenoble 2) SAS, Grenoble (FR); STMicroelectronics (Rousset) SAS, Rousset (FR)

(*) Notice: Subject to any disclaimer, the term of this patent is extended or adjusted under 35 U.S.C. 154(b) by 0 days.

(21) Appl. No.: 16/516,988

(22) Filed: Jul. 19, 2019

(65) Prior Publication Data
US 2020/0026672 A1    Jan. 23, 2020

(30) Foreign Application Priority Data

Jul. 19, 2018  (FR) ....................... 1856705
Nov. 2, 2018  (FR) ....................... 1871349

(51) Int. Cl.
G06F 13/28    (2006.01)

(52) U.S. Cl.
CPC .................... *G06F 13/28* (2013.01)

(58) Field of Classification Search
CPC ....................................... G06F 13/28
See application file for complete search history.

(56) References Cited

U.S. PATENT DOCUMENTS

| | | | |
|---|---|---|---|
| 5,781,199 A | 7/1998 | Oniki et al. | |
| 5,983,301 A * | 11/1999 | Baker | G06F 13/28 710/22 |
| 6,092,116 A * | 7/2000 | Earnest | G06F 13/28 709/212 |
| 6,573,905 B1 * | 6/2003 | MacInnis | G06T 9/007 345/501 |
| 6,782,465 B1 | 8/2004 | Schmidt | |
| 10,997,087 B2 | 5/2021 | Cloute | |
| 2003/0225991 A1 * | 12/2003 | Calderon | H04L 49/103 711/171 |
| 2005/0004815 A1 * | 1/2005 | Machtelinck | G06Q 10/1095 705/2 |
| 2006/0050693 A1 | 3/2006 | Bury et al. | |
| 2006/0182118 A1 * | 8/2006 | Lam | H04L 47/2416 370/395.42 |
| 2006/0259657 A1 * | 11/2006 | Sachs | G06F 13/28 710/22 |

(Continued)

FOREIGN PATENT DOCUMENTS

WO    0129656 A2    4/2001

OTHER PUBLICATIONS

NXP Semiconductors, "QorIQ LS1021A Reference Manua," Supports LS1020A and LS1022A, Document No. LS1021ARM, Rev. 1, Jun. 2016, 3251 pages.

*Primary Examiner* — Henry Tsai
*Assistant Examiner* — Aurangzeb Hassan
(74) *Attorney, Agent, or Firm* — Slater Matsil, LLP (57) ABSTRACT

A memory contains a linked list of records representative of a plurality of data transfers via a direct memory access control circuit. Each record is representative of parameters of an associated data transfer of the plurality of data transfers. The parameters of each record include a transfer start condition of the associated data transfer and a transfer end event of the associated data transfer.

23 Claims, 5 Drawing Sheets

(56) References Cited

U.S. PATENT DOCUMENTS

| | | | |
|---|---|---|---|
| 2007/0030276 A1* | 2/2007 | MacInnis | G06T 9/007 |
| | | | 345/505 |
| 2007/0162647 A1* | 7/2007 | Tousek | G06F 13/28 |
| | | | 710/22 |
| 2008/0228896 A1* | 9/2008 | Krig | G06F 13/385 |
| | | | 709/212 |
| 2011/0219152 A1 | 9/2011 | Kawata | |
| 2011/0280307 A1* | 11/2011 | MacInnis | G06T 9/00 |
| | | | 375/240.15 |
| 2013/0080641 A1* | 3/2013 | Lui | H04L 43/045 |
| | | | 709/226 |
| 2013/0110883 A1* | 5/2013 | Junqueira | G06F 16/2336 |
| | | | 707/803 |
| 2013/0333015 A1* | 12/2013 | Reynolds | G06F 21/32 |
| | | | 726/7 |
| 2015/0186068 A1 | 7/2015 | Benisty et al. | |
| 2016/0140473 A1* | 5/2016 | Hodes | G06Q 10/06316 |
| | | | 705/7.21 |
| 2016/0232105 A1* | 8/2016 | Goss | G06F 21/575 |
| 2018/0189642 A1* | 7/2018 | Boesch | G06N 3/08 |
| 2018/0365181 A1 | 12/2018 | Cottam et al. | |
| 2019/0179932 A1* | 6/2019 | Hostetter | G06F 16/2365 |

* cited by examiner

DIRECT MEMORY ACCESS

CROSS-REFERENCE TO RELATED APPLICATIONS

This application priority to French Patent Application No. 1871349, filed on Nov. 2, 2018, and to French Patent Application No. 1856705, filed on Jul. 19, 2018, which applications are hereby incorporated herein by reference. U.S. patent application Ser. No. 16/511,362, filed Jul. 15, 2019, also claims priority to French Patent Application No. 1856705 and is incorporated herein by reference.

TECHNICAL FIELD

The present disclosure generally concerns electronic systems and, in particular embodiments, electronic systems utilizing data transfers by direct memory access (DMA).

BACKGROUND

Direct memory access is a method enabling, in an electronic system, to transfer data between a peripheral and a memory, between two peripherals, or between two memories with no intervention of a central processing unit (CPU), except to start and end the transfer.

Direct memory access is generally implemented by a direct memory access control circuit. To perform a data transfer, the circuit reads from a memory a record from a linked list of records (LLI—"Linked List Item) to obtain the parameters of the transfer. The read parameters are temporarily stored in a register assembly, or register bank, of the circuit. The circuit then performs the transfer according to the stored parameters.

SUMMARY

The present disclosure generally concerns electronic systems. Particular embodiments concern electronic systems where executions of tasks, for example, data transfers by direct memory access (DMA), are parameterized by a linked list of records stored in a memory.

Some embodiments can overcome at least certain disadvantages of known electronic systems. For example, embodiments overcome at least certain disadvantages of electronic circuits where a task is parameterized by registers programmed from a linked list of records stored in a memory. As another example, embodiments overcome at least certain disadvantages of electronic systems where the task parameterized by the registers is a data transfer by direct memory access.

According to a first aspect, an embodiment provides a memory containing at least one linked list of records, each record containing a first field determining the number of fields of the next record.

According to an embodiment, each field of a record is representative of content to be programmed in a register of a register bank.

According to an embodiment, the first field determines in which registers the contents should be programmed.

According to an embodiment, the first field comprises bits, each of which identifies a register, the values of the bits determining the fields of the record to be programmed.

According to an embodiment, each record is representative of parameters of execution of a task.

According to an embodiment, the task is a data transfer by a direct memory access control circuit.

According to an embodiment, for each record representative of a data transfer, the parameters of execution of the transfer comprise a transfer start condition and a transfer end event.

According to an embodiment, for each record, the parameters of execution of the transfer further comprise an indication of at least one time when the condition should be detected and of at least one time when the event should be generated.

According to an embodiment, the memory contains a first and a second linked list of records, the start condition of a record of the first list corresponding to a detection of the event of a record of the second list.

According to an embodiment, the memory is of SRAM type.

According to the first aspect, an embodiment provides a method comprising successive updates of a bank of registers based on a linked list of records contained in a memory such as previously defined.

According to an embodiment, each record determines one of the successive updates.

According to an embodiment, a method comprises reading the programmed register from the first field of a current record; deducing therefrom, for each register, whether the next record comprises a field from which the register should be programmed during the next programming of the register bank; and during the next programming of the register bank, programming, based on each field of the next record, the corresponding register in the register bank.

According to the first aspect, an embodiment provides an electronic system comprising a memory such as previously defined, and a circuit provided with a register bank, the circuit being configured to implement the previously-defined method.

According to an embodiment, the circuit is a direct memory access controller.

According to a second aspect, an embodiment provides a memory containing at least one linked list of records, each record being representative of parameters of a data transfer by a direct memory access control circuit, the parameters comprising a transfer start condition and a transfer end event.

According to an embodiment, for each record, the parameters comprise an indication of a client of the transfer.

According to an embodiment, the transfer start condition is at least partly determined by the client of the transfer.

According to an embodiment, for each record, the parameters comprise an identification of a transfer start signal, the condition being at least partly determined by the transfer start signal.

According to an embodiment, for each record, the parameters comprise an indication of at least one time when the condition should be detected or that the condition should not be detected.

According to an embodiment, for each record, the parameters comprise an indication of at least one time when the event should be generated or that the event should not be generated, the event preferably being a modification of a transfer end signal.

According to an embodiment, each record contains a first field determining the number of fields of the next record, each field of a record being representative of content to be programmed in a register of a register bank of the direct memory access control circuit.

According to an embodiment, the first field determines in which registers the contents should be programmed, the first field preferably comprising bits, each of which identifies a register, the values of the bits determining the fields of the record to be programmed.

According to an embodiment, for each record, the parameters comprise an indication that the transfer is a transfer of a piece of data, of a plurality of data, of a data block, or of a plurality of data blocks.

According to an embodiment, the indication of the at least one time is selected among: before each transfer of a piece of data, only before the transfer of the first piece of data, before the transfer of each data block, and only before the transfer of the first data block.

According to an embodiment, for each record, the parameters further comprise an indication of at least one time when the condition should be detected and of at least one time when the event should be generated.

According to an embodiment, the memory contains a first and a second linked lists of records, the start condition of a record of the first list corresponding to a detection of the end event of a record of the second list.

According to an embodiment, each record contains a first field determining the number of fields of the next record.

According to an embodiment, each field of a record is representative of content to be programmed in a register of a register bank.

According to an embodiment, the first field determines in which registers the contents should be programmed.

According to an embodiment, the first field comprises bits, each of which identifies a register, the values of the bits determining the fields of the record to be programmed.

According to an embodiment, the first record in the list contains as many fields as there are registers.

According to an embodiment, the memory is of SRAM type.

According to the second aspect, an embodiment provides a method of data transfer by direct memory access wherein data transfers are performed on a channel of a direct memory access control circuit, each first data transfer on this channel being parameterized by a corresponding record of a list of a memory such as previously defined.

According to an embodiment, each record in the list corresponds to an update of a register bank associated with the channel.

According to an embodiment, a current content of the register bank parameterizes a corresponding transfer on the channel.

According to an embodiment, for each record, the corresponding transfer only starts if the transfer start condition is detected.

According to the second aspect, another embodiment provides a method of data transfer by direct memory access wherein first transfers are performed on a first channel of a direct memory access control circuit and second transfers are performed on a second channel of the circuit, each first transfer being parameterized by a corresponding record of a first list of a memory such as previously defined.

According to an embodiment, each record in the first list corresponds to an update of a first register bank associated with the first channel, and each record of the second list corresponds to an update of a second register bank associated with the second channel.

According to an embodiment, a current content of each register bank parameterizes a corresponding transfer over the channel having the register bank associated therewith.

According to an embodiment, for each record, the corresponding transfer only starts if the start condition of the record is detected.

According to the second aspect, an embodiment provides an electronic system comprising a memory such as previously defined, and a direct memory access control circuit provided with a plurality of channels, each of which is associated with a register bank, the circuit being configured to implement one of the methods such as previously defined.

The foregoing and other features and advantages will be discussed in detail in the following non-limiting description of specific embodiments in connection with the accompanying drawings.

DETAILED DESCRIPTION OF ILLUSTRATIVE EMBODIMENTS

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the various parameters currently used for data transfers by direct memory access have not been detailed, the described embodiments being compatible with such usual parameters. Further, the various electronic systems having a direct memory access controller provided therein have not been detailed, the described embodiments being compatible with most of such usual electronic systems.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", "approximately", and "in the order of" are used herein to designate a tolerance of plus or minus 10%, preferably of plus or minus 5%, of the value in question.

Figure 1:
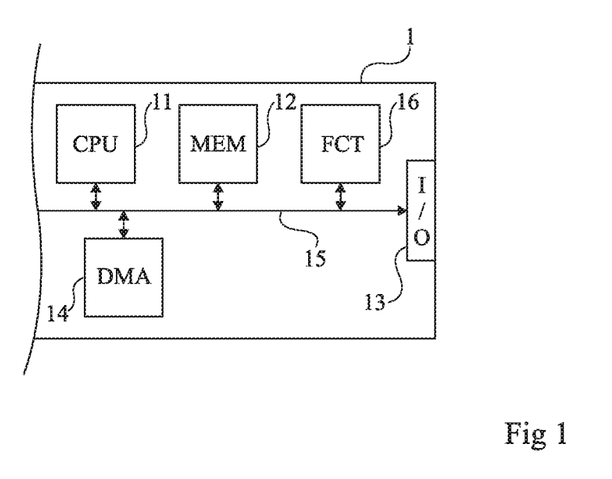
FIG. 1 very schematically shows in the form of blocks an embodiment of an electronic circuit 1 of the type to which the embodiments which will be described apply as an example.

FIG. 1 very schematically shows, in the form of blocks, an embodiment of an electronic circuit or system 1 of the type to which the embodiments which will be described apply as an example.

Electronic system 1 comprises a central processing unit 11 (CPU), for example, a state machine, a microprocessor, a programmable logic circuit, etc. One or a plurality of memories, among which at least one RAM 12 (MEM), for example, of SRAM type are included in the system. At least one input/output interface 13 (I/O) of communication, for example, of serial bus type, can communicate with the outside of system 1. The system also includes a direct memory access control circuit 14 (DMA) one or more data, address, and/or control buses between the different elements internal to system 1, here shown in the form of a single bus 15.

Further, system 1 may integrate other functions, symbolized by a block 16 (FCT), according to the application, for example, a processor dedicated to image processing, other interfaces, other memories, etc.

System 1 is configured to execute various applications such as image processing, encoding, and/or video decoding, data processing originating from a sensor, etc. Such applications require data transfers, via bus 15, between elements internal to system 1. To fluidize the operation of system 1 and to decrease the load of central processing unit 11, such data transfers are performed by direct memory access, under control of circuit 14. In this embodiment, circuit 14 comprises a plurality of data transfer channels. Each channel of circuit 14 enables to perform data transfers between two elements (circuit and/or memory) of system 1. Each channel is associated with a register bank storing, for each data transfer over the channel, the parameters of the transfer.

When an application has to be executed by system 1, central processing unit 11 configures circuit 14 so that circuit 14 reserves one of these channels to the application. All the data transfers of the application are then performed via the channel reserved for the application. In the described embodiments, the source element and/or the destination element of the data to be transferred may change during the execution of the application.

Figure 2:
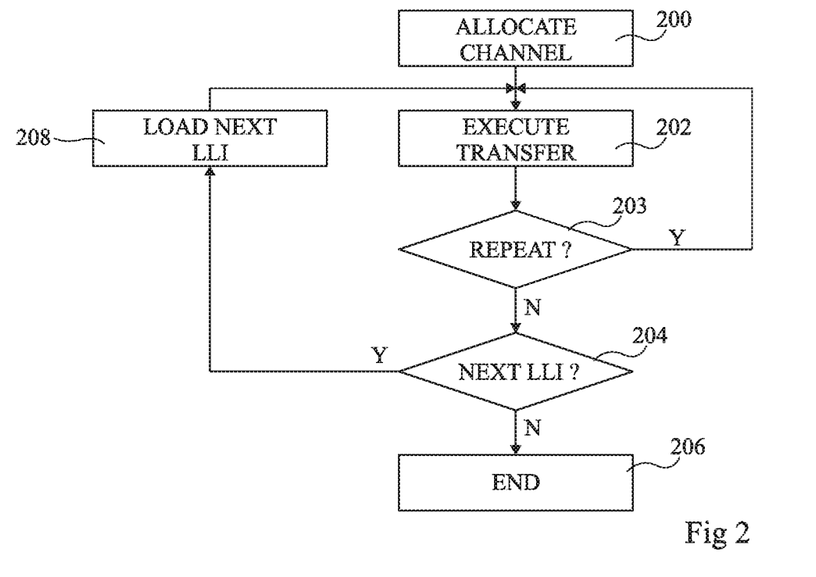
FIG. 2 is a flowchart illustrating in the form of blocks an embodiment of a method of data transfer by direct memory access.

FIG. 2 is a flowchart illustrating, in the form of blocks, an embodiment of a method of data transfer by direct memory access. More particularly, FIG. 2 illustrates, for a given application, a method of successive updates of a register bank associated with a channel of circuit 14 of FIG. 1, from a linked list of records representative of the data transfers of the application.

At an initial step 200 (ALLOCATE CHANNEL), a channel is assigned to an application by programming the register bank associated with this channel with the parameters of a first data transfer of this application. This step amounts to indicating to circuit 14 which linked list of records it should use to parameterize the transfers which are to take place on the channel. Each record in the list determines the memory address of the next record. Each record further determines the parameters of a corresponding data transfer, for example, the indication that the transfer concerns data or data blocks, the start address of an address range of a source where the data or the data blocks to be transferred are stored, the start address of an address range of a destination where the transferred data or data blocks should be copied, the number of data or of data blocks to be transferred, the size of the data, the number of data per blocks, address shifts between two successive data or between two successive blocks to be transferred, etc. Each record may thus correspond to the transfer of a piece of data, of a plurality of data, of a data block or of a plurality of blocks between a source and a destination.

According to an embodiment, at step 200, the register bank is programmed by reading from memory 12, at a memory address supplied by central processing unit 11, the first record in a list and by programming the register bank based on this record.

According to another embodiment, at step 200, the register bank is directly programmed, with no reading of a record from memory 12, for example, on initialization of system 1 or by central processing unit 11. In particular, the address of the first record in a list is then programmed in the register bank.

Once the register bank has been programmed to allocate the channel to the application, central processing unit 11 indicates to circuit 14 that it can start executing the data transfers of the application.

At a next step 202 (EXECUTE TRANSFER), circuit 14 performs, on the channel reserved for the application, the data transfer parameterized by the content of the register bank of the channel, it being understood that such a transfer may concern a plurality of data or a plurality of data blocks.

A test 203 (REPEAT?) is then performed to determine, from the content of the register bank, whether the data transfer executed at the previous step 202, and having its parameters stored in the register bank, should or not be repeated.

If the transfer has to be repeated (output Y of block 203), the method carries on at step 202. It can thus be understood that, since the content of the register bank is then not modified, the transfer is then executed in a loop.

If this last transfer does not have to be repeated (output N of block 203), the method carries on with a test 204 (NEXT LLI?). This test determines, based on the current content of the register bank, whether there is a next record in the list, in other words whether there remains at least one transfer to be performed for this application.

If there is no next record in the list (output N of block 204), test 204 is followed by a step 206 (END) where the channel is freed and may thus be allocated to a new application.

If there is a next record (output Y of block 204), test 204 is followed by a step 208 (LOAD NEXT LLI) where the next record is read from memory 12 by circuit 14 and the register bank is updated with the parameters of the next data transfer of the application. The method then proceeds to step 202.

It should be noted that the order and/or the number of the steps of the method of FIG. 2 may be modified. In particular, tests 203 and 204 may be simultaneously carried out.

As an example, the case where the transfers which should occur on a channel are not performed at the data block level, but only at the data level, is considered in the rest of the disclosure. It is also considered that when a transfer corresponds to the transfer of a plurality of data, the data are stored one after the others in a source address range and copied one after the others into a destination address range.

Figure 3:
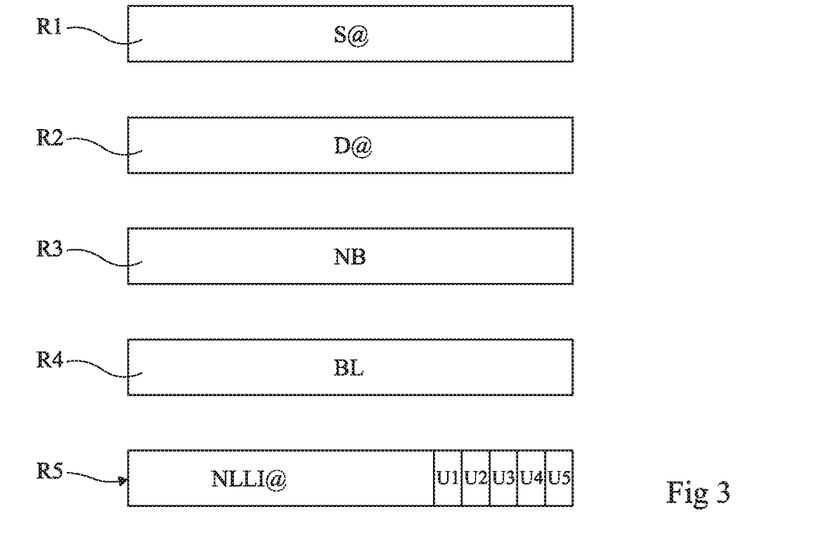
FIG. 3 schematically shows in the form of blocks an embodiment of a register bank of a direct memory access control circuit.

FIG. 3 schematically shows in the form of blocks an embodiment of a register bank associated with a data transfer channel of circuit 14.

In this example, the register bank comprises five registers R1, R2, R3, R4, and R5 enabling to temporarily store the parameters of a data transfer. Registers R1, R2, R3, R4, and R5 are here intended to respectively store the start address S@ of a source of the data to be transferred, the start address D@ of an address range of a destination of the data to be transferred, number NB of data to be transferred, the size BL of the data to be transferred, and the address NLLI@ of the next record in memory 12. In the rest of the disclosure, linked list register or LLR register designates the register intended to store the information relative to the linked list of records, and in particular address NLLI@. Preferably, register LLR is the last register in the register bank, in this example, register R5.

In this embodiment, one of the registers, preferably, the LLR register, is also intended to store information relative to the next record in the list. Such information determines the number of fields of the next record in the list. Each field of a record is for example representative of content to be programmed in a corresponding register, at the next update of the register bank. Preferably, each field is directly copied into a corresponding register during this update. The information relative to the next record in the list further determines which register each field of the next record is allocated to. Such information is stored by bits of LLR register R5, for example, five bits U1, U2, U3, U4, and U5. In this embodiment, bits U1, U2, U3, U4, and U5 are respectively allocated to registers R1, R2, R3, R4, and R5, the value of each bit U1, U2, U3, U4, U5 determining whether the next record comprises a field representative of a content to be programmed in the register, respectively R1, R2, R3, R4, R5. For example, if bit U1 is at a first binary value, for example '1', the next record comprises a field representative of a content to be programmed in register R1, and if the bit is at the second binary value, for example '0', the next record comprises no such field.

As an example, test 203 described in relation with FIG. 2 comprises verifying whether all bits U1 to U5 are at '0' and whether address @NLLI is not null. If this is true, this means that the register bank does not have to be updated and that the last executed transfer should be repeated.

Still as an example, test 204 described in relation with FIG. 2 comprises verifying whether address @NLLI is null. If this is true, this means that there is no next record and that all the transfers of the application have been performed.

It should be noted that the information relative to the number of fields of the next record and to the register to which each of these fields is allocated, the indication according to which a transfer should be repeated, and/or the indication according to which the list contains no next record, may be represented in a form different from that described hereabove as an example.

Figure 4:
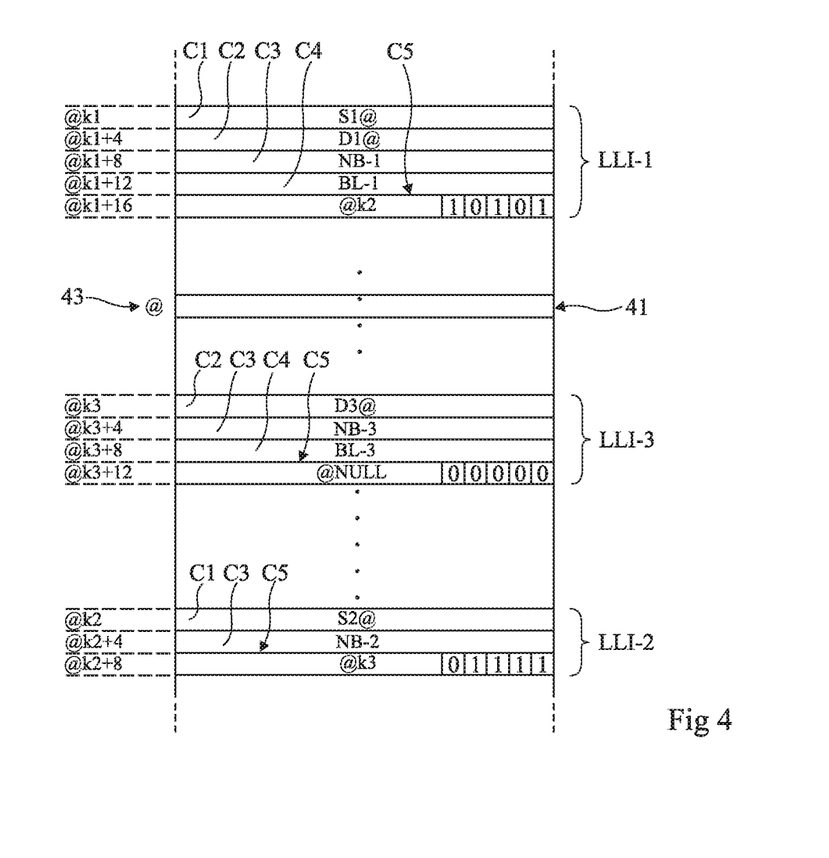
FIG. 4 schematically shows a memory containing an embodiment of a linked list of records to program the registers of FIG. 3.

FIG. 4 schematically shows a memory, for example, memory 12 of FIG. 1, containing an embodiment of a linked list of records to program the registers of FIG. 3.

Memory 12 is divided into a plurality of memory words 41 of fixed size, for example, 4 bytes, each being associated with a memory address 43. Memory 12 contains a linked list of records formed, in this example, of three records LLI-1, LLI-2, and LLI-3. The fields of a same record are recorded one after the others in memory 12, here from the memory address of the first field of this record. In this example, each field occupies a memory word 41. As a variation, each field may require more than one memory word for its memory storage or a memory word may contain more than one field. Preferably, the fields of each record follow one another in the same order as the corresponding registers of the register bank. In this example, the memory address of a record corresponds to the address at which the first field of this record is recorded.

In this example, the case where, at step 200 of FIG. 2, the register bank is programmed based on the first record LLI-1 in the list is considered. As illustrated in FIG. 4, first record LLI-1 then comprises as many fields as there are registers, five in the present example, so that each register can be programmed with a field of the record. More particularly, record LLI-1 comprises successive fields C1, C2, C3, C4, and C5 representative of content to be programmed in the registers, respectively R1, R2, R3, R4, and R5. In this example, fields C1, C2, C3, and C4 of record LLI-1 are respectively representative of an address S1@, of an address D1@, of a number NB-1, and of a size BL-1. Field C5 of the record is representative of address @k2 of the next record LLI-2 in memory 12, and of information relative to this next record LLI-2. In this example, the information relative to the next record is in the form of five bits of values 'i', '0', '1', '0', and '1' respectively corresponding to bits U1, U2, U3, U4, and U5 of record R5. In this example, first field C1 of record LLI-1 is recorded in address memory word @k1 and the next fields C2, C3, C4, and C5 are recorded in the next memory words of respective addresses @k1+4, @k1+8, @k1+12, and @k1+16, each memory word here occupying four bytes.

Second record LLI-2 comprises successive fields C1, C3, and C5 representative of content to be programmed in the registers, respectively, R1, R3, and R5. Fields C1 and C2 are respectively representative of an address S2@ and of a number NB-2, field C5 being representative of address @k3 of the next record LLI-3 and of five bits of values '0', '1', '1', '1', and '1' respectively corresponding to bits U1, U2, U3, U4, and U5 of register R5. In this example, first field C1 of record LLI-2 is recorded in address memory word @k2 and the next fields C3 and C5 are recorded in the next memory words of respective addresses @k2+4 and @k2+8.

Third record LLI-3 comprises successive fields C2, C3, C4, and C5 representative of content to be programmed in the registers, respectively R2, R3, R4, and R5. Fields C2, C3, and C4 are respectively representative of an address D3@, of a number NB-3, and of a size BL-3. In the shown example, field C5 is representative of a zero address @NULL and of five bits U1 to U5 of value '0', which indicates that record LLI-3 is the last one in the list and that the transfer corresponding to this record does not have to be repeated. In this example, first field C2 of record LLI-3 is recorded in address memory word @k3 and the next fields C3, C4, and C5 are recorded in the next memory words of respective addresses @k3+4, @k3+8, and @k3+12.

In the above-described list, at least certain records stored in the memory contain a number of fields smaller than the number of registers of the register bank updated based on these records. Thus, the storage capacity of memory 12 may be decreased with respect to that of a memory where each record in a linked list would have as many fields as there are registers in the register bank. The decrease in the storage capacity of memory 12 causes a decrease in its surface area and in its static power consumption.

Figure 5:
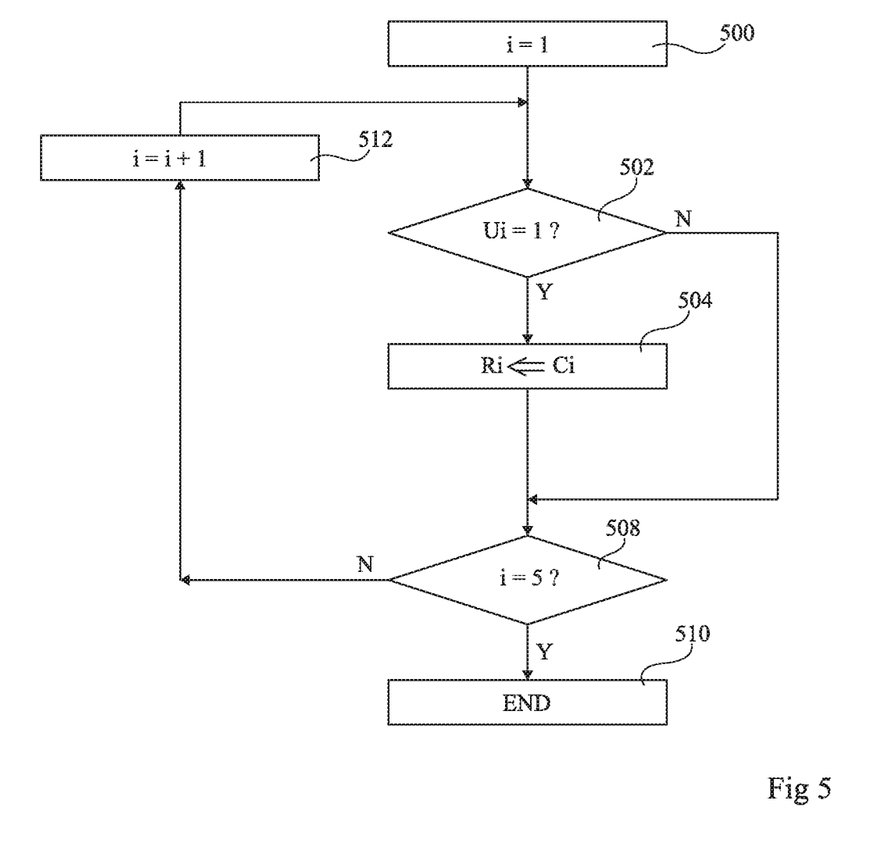
FIG. 5 is a flowchart illustrating in further detail an embodiment of a step of the method of FIG. 2.

FIG. 5 illustrates, in the form of a flowchart, step 208 of the method of FIG. 2 described hereabove, that is, the updating of a register bank based on a record in a linked list of records stored in the memory.

At an initialization step 500 (i=1), a loop variable i, i being an integer, is initialized, to 1 in the present example.

At a next test step 502 (U1=1?), circuit 14 tests the current value of bit Ui of LLR register R5 to determine whether the next record contains a field Ci representative of a content to be programmed in register Ri.

If, during step 502, the current value of bit Ui of LLR register R5 is '1' (output Y of block 502), this means that the next record comprises a field Ci representative of a content to be programmed in register Ri. The test is then followed by a step 504 (Ri⇐Ci) of programming register Ri with this content. Step 504 is followed by a test 508 (i=5?) during which it is verified whether the current value of each bit Ui of register R5 has been tested. If so (output Y of block 508), the update of the register bank based on the next record is finished (block END, 510). Otherwise (output N of block 508), the method carries on at a step 512 (i=i+1) where variable i is incremented, after which the method loops back onto step 502.

If, during step 502, the current value of bit Ui of LLR register R5 is '0' (output N of block 502), this means that the next record does not comprise a field Ci representative of a content to be programmed in register Ri. The method then directly carries on to step 508 and the content of register Ri is left unchanged.

The above-described method enables, when the register bank associated with a channel is updated from a record of a linked list of the type described in FIG. 4, to only update certain registers in the register bank, preferably only the registers having a content which is modified between two successive transfers. This results in a decrease in the number of accesses to memory 12 with respect to the case where all the registers in the bank would be updated. Such a decrease in the number of accesses to memory 12 causes a decrease in the dynamic power consumption of memory 12, and more generally of system 1 of FIG. 1. Advantage is here taken from the fact that two successive data transfers on a channel reserved for an application generally have certain identical parameters.

It should be noted that the order and/or the number of the steps of the above method may be modified. For example, all bits Ui may first be read, after which all the updates of the registers are performed according to the values of the read bits.

Further, the embodiments described in relation with FIGS. 1 to 5 apply to register banks of other circuits than a direct memory access controller, to parameterize the execution of a task by the circuit.

In the above-described embodiments, as is generally the case in a direct memory access control circuit, once a channel has been allocated to an application (step 200, FIG. 2) and central processing unit 11 has authorized circuit 14 to execute the transfers of this application, circuit 14 performs all these transfers autonomously, with no intervention of central processing unit 11. Once all the transfers have been performed, circuit 14 notifies central processing unit 11, which can then allocate the channel to another application. Thus, a synchronization between two applications, executed on two different channels of circuit 14, can only be performed by central processing unit 11, either at the beginning of the execution of one of the two applications, or at the end of the execution of one of the two applications, when all the records corresponding to the data transfers of this application have been read out and the corresponding transfers have been performed.

Figure 6:
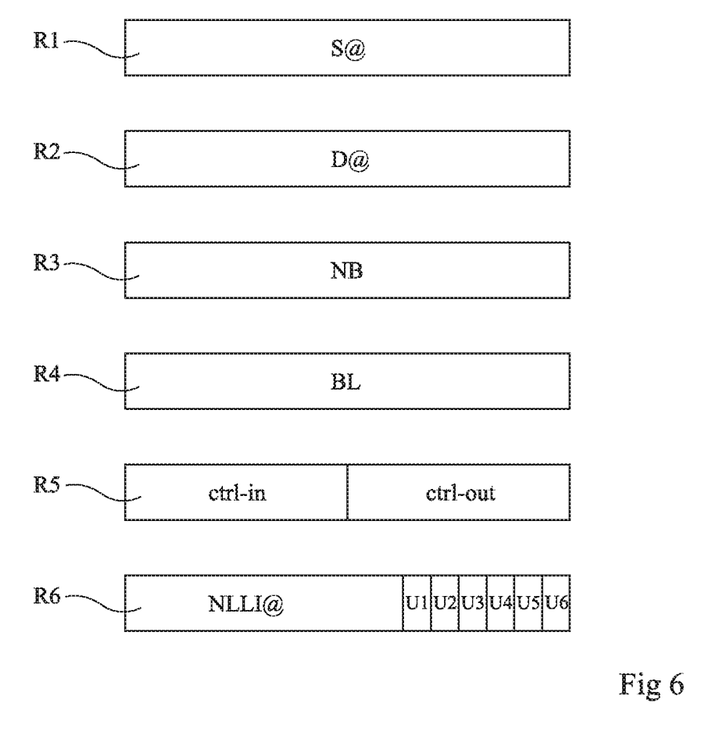
FIG. 6 schematically illustrates in the form of blocks another embodiment of a register bank of a direct memory access control circuit.

FIG. 6 schematically shows in the form of blocks an example of another embodiment of a register bank of a data transfer channel of circuit 14.

The register bank of FIG. 6 here comprises six registers R1, R2, R3, R4, R5, and R6, registers R1, R2, R3, and R4 of FIG. 6 being, in this example, similar to registers R1, R2, R3, and R4 of FIG. 3. Register R5 is here intended to store a transfer start condition ctrl-in and a transfer end event ctrl-out. Register R6 forms the linked list register (LLR) of the register bank and is, as in FIG. 3, intended to store the address NLLI@ of a next record and the information relative to this next record, particularly the number of fields of the record and which register each field of the next record is allocated to. Such information is here stored in the form of six bits U1, U2, U3, U4, U5, and U6 respectively associated with registers R1, R2, R3, R4, R5, and R6.

The updating of the register bank of FIG. 6 based on a record of a linked list of records is performed similarly to what has been described in relation with FIGS. 1 to 5, the records in the list being accordingly adapted. In particular, each record may comprise an additional field C6 (not illustrated) representative of content to be programmed in register R6. Further, for each record, field C6 of the record may then comprise six bits corresponding to the six bits U1 to U6 of register R6.

In an alternative embodiment, condition ctrl-in and event ctrl-out are stored in one of registers R1 to R4 and R6, and condition ctrl-in may be stored in another register than that storing event ctrl-out. Such a variation is for example implemented when one or a plurality of registers R1 to R4 and R6 contain unused bits then enabling to store information ctrl-in and ctrl out. This enables to suppress register R5, LLR register R6 being then given number R5.

Figure 7:
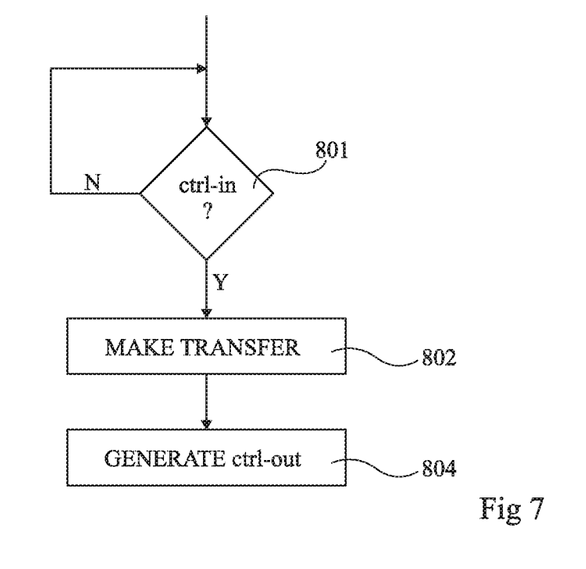
FIG. 7 is a timing diagram illustrating an embodiment of a method of data transfer by direct memory access.

FIG. 7 is a flowchart illustrating an embodiment of a data transfer by direct memory access. More particularly, FIG. 7 illustrates in further detail step 202 of the method of FIG. 2.

At a step 801 (ctrl-in?) implemented by circuit 14, all the parameters of the data transfer to be executed are stored in the registers of the register bank. Step 801 comprises detecting transfer start condition ctrl-in, stored in register R5 in the present example. Step 801 is repeated (output N of block 801) as long as condition ctrl-in has not been detected. When condition ctrl-in is detected (output Y of block 801), the method carries on with a step 802 (MAKE TRANSFER) during which the data transfer parameterized by the content of the register bank is performed and then, once the transfer is finished, with a step 804 (GENERATE ctrl out) during which event ctrl-out is generated by circuit 14.

In this embodiment, when an event ctrl-out is generated at the end of a first data transfer over a first channel reserved to a first application, and condition ctrl-in of beginning of a second transfer over a second channel reserved to a second application corresponds to the detection of event ctrl-out, the second transfer can only start after the generation of event ctrl-out of the first transfer. Thus, the first and second transfers, and thus the first and second applications, may be synchronized with respect to each other, directly at the level of circuit 14, with no intervention of central processing unit 11 and while these applications are being executed. More generally, the provision of a condition ctrl-in and of an event ctrl-out for at least certain data transfers of a plurality of applications executed by system 1 enables to synchronize these applications together, without using the central processing unit, which may be set to stand-by, or even turned off, during the execution of the applications.

In an alternative embodiment, an additional parameter indicating at what time condition ctrl-in should be detected during a transfer of a plurality of data, for example, before the transfer of the first piece of data or before the transfer of each piece of data, is provided. Similarly, an additional parameter indicating at what time event ctrl-out should be generated on transfer of a plurality of data, for example, after the transfer of the last piece of data or after the transfer of each piece of data, is provided. The registers and the records in the list are then adapted to integrate such additional parameters. The method of FIG. 7 is also accordingly adapted. For example, during a transfer of a plurality of data, if condition ctrl-in is detected before each transfer of a piece of data and event ctrl-out is generated after each transfer of a piece of data, steps 801, 802, and 804 are implemented for each transferred piece of data, step 802 then corresponding to the transfer of the piece of data.

The provision of one or a plurality of additional parameters to indicate the time(s) of a transfer at which a condition ctrl-in should be detected and the time(s) at which an event ctrl-out should be generated enables to control the granularity with which the synchronization is performed between applications executed in parallel by system 1.

It should be noted that condition ctrl-in of a transfer on a channel may correspond to the detection of an event other than an event ctrl-out generated during a transfer on another channel, for example, to the detection of an event generated in system 1, for example, originating from block 13 (I/O) of system 1.

As an example, each condition ctrl-in may correspond to the detection of a level change, for example, the passing from a high level to a low level or conversely, of a signal corresponding to this condition. Each event ctrl-out for example comprises changing the level of a signal corresponding to this event.

It should be noted that the embodiment of FIGS. 6 and 7 may be implemented without bits U1 to U6. In this case, since there is no conditional update of the registers, each record in the linked list contains as many fields as there are registers.

In alternative embodiments, the registers and the records described in relation with FIGS. 3 to 7 may integrate one or a plurality of additional parameters to manage transfers by data blocks and/or, in a source and/or destination address range, address shifts between two successive data or two data blocks to be transferred.

Further, in the case where the registers and the records are capable of managing transfers by data blocks, it may be provided that, during a transfer of a plurality of data blocks, condition ctrl-in are detected before the transfer of each block and/or event ctrl-out is generated after the transfer of each block. The parameter(s) indicating at which times condition ctrl in should be detected and/or event ctrl-out should be generated will then be adapted accordingly, as well as the method described in relation with FIG. 7.

Figure 8:
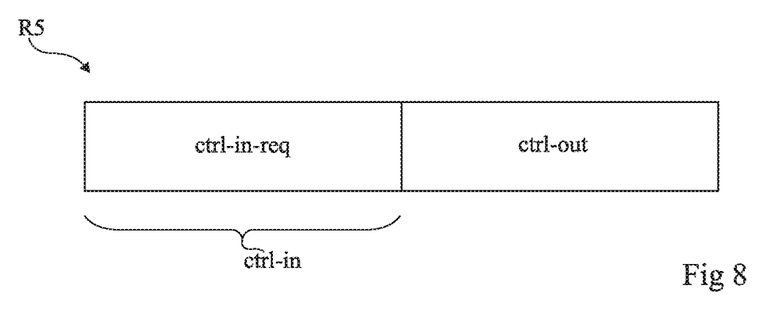
FIG. 8 schematically shows in the form of blocks an example of a register bank of a direct memory access control circuit, according to the embodiment of FIG. 6.

FIG. 8 schematically shows in the form of blocks an example of a register bank of a direct memory access control circuit according to the embodiment of FIG. 6. In FIG. 8, only register R5 is shown, registers R1 to R4 and R6 being for example identical to those described in relation with FIG. 6.

In this embodiment, the condition ctrl-in described in relation with FIG. 6 comprises a parameter ctrl-in-req representative of the identification of the client of the transfer parameterized by the content of the registers of the register bank associated with the channel of the transfer. In other words, parameter ctrl in-req is representative of the identification of the element of system 1, for example, functional block 16 (FTC), which requires the transfer of data. Thus, for each transfer corresponding to a record of a linked list of records, the client of the transfer is dynamically associated with the channel over which the transfer should occur.

More particularly, the identification of the client of a transfer amounts to identifying which is the request signal which will cause the transfer. Thus, when a data transfer has been parameterized by programming, from a corresponding record of a linked list of records, the register bank associated with the transfer channel, the transfer can only start after the transmission of a request by the client of the transfer or, in other words, the beginning of the transfer is conditioned by the request.

In this embodiment, circuit 14 thus directly receives memory access requests from the clients of the data transfers occurring on channels of circuit 14. The requests are then directly processed in circuit 14, circuit 14 being capable, based on the information contained in the register banks associated with the transfer channels, of knowing to which channel each request should be transmitted, or in other words, of knowing, for each request, which is the channel on which the beginning of a planned transfer is conditioned by the reception of the request.

As a comparison, in embodiments which do not comprise parameter ctrl-in-req, for a channel of circuit 14 to know the client of a transfer on the channel, each potential client of a data transfer, that is, each element of system 1 capable of requesting a data transfer, is statically associated, for example, on initialization of system 1, with at least one given channel of circuit 14, and a plurality of clients may be associated with a same channel. System 1 then comprises, outside of DMA circuit 14, a request routing circuit configured to receive all the data transfer requests and to transmit, in accordance with the static client/channel allocation, each received request to each channel having the client having transmitted the request associated therewith.

The embodiments comprising parameter ctrl-in-req have advantages over those which do not comprise it.

In particular, the provision of parameter ctrl in-req enables to avoid using an additional circuit for routing data transfer requests, whereby system 1 consumes less power and occupies a decreased surface area with respect to the case where such a routing circuit is provided.

Further, in embodiments comprising parameter ctrl-in-req, an application may comprise a plurality of clients, dynamically associated with the channel reserved by the application. However, in embodiments without parameter ctrl-in-req, an application can only comprise a single client due to the static client/channel allocation. Such a difference, and the resulting advantages, will be illustrated in further detail hereafter, referring to the following example of execution where it is considered that:

a first client performs first data transfers with memory 12, each first transfer corresponding to a writing, into the memory, of a piece of data from the first client; a second client performs second data transfers with memory 12, each second transfer corresponding to a reading out, by the second client, of a piece of data stored in the memory; and after each writing of a piece of data into the memory during a first transfer, the piece of data is read from the memory during a second transfer, so that a second transfer can only occur after a first corresponding transfer.

In an embodiment comprising parameter ctrl-in req, the implementation of the above example of execution may be performed by means of a single application comprising the first and second transfers, and thus the first and second clients. In other words, a same linked list of records may be used to configure the first and second transfers on a same channel. More particularly, a first transfer is configured by programming the parameters, and in particular parameter ctrl-in-req, of this first transfer in the registers of the register bank of the channel. The transmission of a request by the first client then causes the implementation of the first transfer over the channel, after which a second transfer is configured, on this same channel, by programming the parameters, and in particular parameter ctrl-in-req, of the second transfer in the registers of the register bank of the channel. The transmission of a request by the second client then causes the implementation of the second transfer on the channel. The execution carries on by repeating, for the channel, the steps of programming the registers with the parameters of a first transfer, of receiving a request from the first client, of implementing the first transfer on the channel, of programming the registers with the parameters of a second transfer, of receiving a request from the second client, and of implementing the second transfer on the channel.

However, in an embodiment which does not comprise parameter ctrl-in-req, the implementation of this example of execution is achieved by means of a first application corresponding to the first transfers, that is, to the first client, and of a second application corresponding to the second transfers, and thus to the second client. In other words, a first linked list of records is used to configure the first transfers over a first channel having the first client statically associated therewith, a second linked list of records being used to configure the second transfers over a second channel having the second client statically associated therewith. As a result, during a first transfer over the first channel, the second channel is reserved by the second application but is not used.

It can be understood from the above example that the provision of parameter ctrl-in-req enables to dynamically associate clients with channels of circuit 14, which results in a decrease in the time for which a channel is reserved without being used and/or a decrease in the number of necessary channels. In particular, the decrease in the number of channels of circuit 14 causes a decrease in the power consumption and in the surface of circuit 14, and more generally of system 1.

Figure 9:
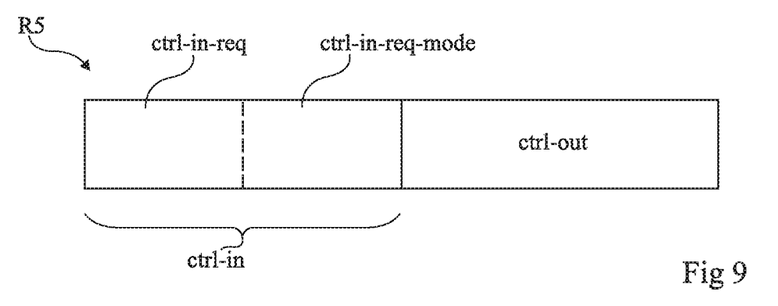
FIG. 9 schematically shows in the form of blocks an alternative embodiment of the register bank of FIG. 8.

FIG. 9 schematically shows in the form of blocks an alternative embodiment of the register bank of FIG. 8.

In this variation, in addition to parameter ctrl in-req, condition ctrl-in comprises a parameter ctrl-in req-mode indicating, for the transfer parameterized by the content of the register bank, at least a time of the transfer when the request from the client identified by parameter ctrl-in-req should be received. In other words, when the transfer parameterized by the content of the register bank corresponds to a plurality of similar transfers, for example, a plurality of data or data block transfers, parameter ctrl-in-req-mode indicates which of the similar transfers are conditioned by the reception of a request from the client of the transfer. For example, for a transfer comprising transferring a plurality of data or a plurality of data blocks, parameter ctrl-in-req-mode indicates that a request from the client should be received before each data transfer, before each data block transfer, or only before the transfer of the first piece of data or of the first data block. In this last case, the data or data block transfers following the transfer of the first piece of data or of the first data block may be performed without for a request to have been transmitted by the client of the transfer.

A plurality of similar transfers, for example, a plurality of transfers of a piece of data or of a data block, having the same client, are considered as an example and it is further considered that each of the similar transfers should only start once a request from the client has been received by circuit 14 or, in other words, that each of the transfers is conditioned by the transmission of a request by the client. The provision of parameter ctrl-in-req-mode enables to gather such similar transfers in the form of a single record of a linked list of records, a single update of the register bank associated with the transfer channel being then performed to parameterize all the similar transfers. Without parameter ctrl-in-req-mode, each of the similar transfers should have corresponded to a different record in the list.

The alternative embodiment described in relation with FIG. 9 thus enables to decrease the number of records in a list, which may enable to decrease the size of memory 12. Such a variation also enables to decrease the number of accesses to memory 12 and of updates of the register banks associated with the channels of circuit 14.

Figure 10:
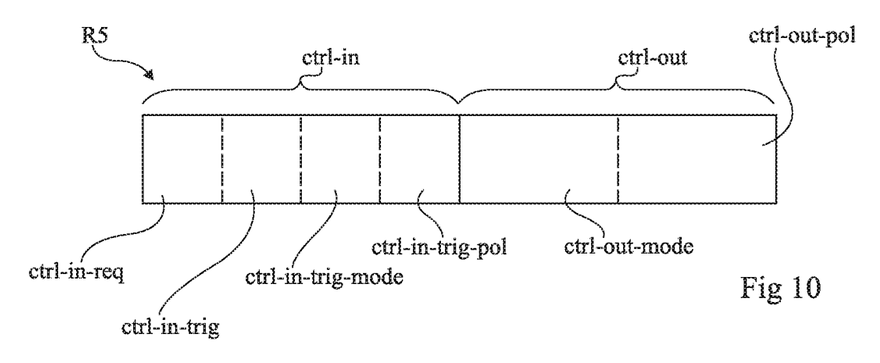
FIG. 10 schematically shows in the form of blocks another example of a register bank of a direct memory access control circuit, according to the embodiment of FIG. 6.

FIG. 10 schematically shows in the form of blocks another example of a register bank of a direct memory access control circuit, according to the embodiment of FIG. 6. In FIG. 10, only register R5 is shown, registers R1 to R4 and R6 being for example identical to those described in relation with FIG. 6.

As compared with the embodiment described in relation with FIG. 8, it is provided for transfer start condition ctrl-in to comprise, in addition to parameter ctrl-in-req, a parameter ctrl-in-trig representative of an identification of a signal conditioning the beginning of the transfer, a parameter ctrl-in-trig-mode representative of the time(s) when a modification of the signal should be detected, and an optional parameter ctrl-in-trig-pol representative of the type of modification, that is, rising edge, falling edge or level change, of the signal conditioning the beginning of the transfer. In other words, when the transfer parameterized by the content of the register bank corresponds to a plurality of similar transfers, for example, a plurality of data or data block transfers, parameter ctrl-in-trig-mode indicates which of the similar transfer(s) is (are) conditioned by the detection of a modification of the signal identified by parameter ctrl-in-trig, the type (or polarity) of this modification being here indicated by parameter ctrl-in trig-pol. For example, for a transfer comprising the transfer of a plurality of data or of a plurality of data blocks, parameter ctrl-in-trig-mode indicates that a modification of the signal identified by parameter ctrl-in-trig should be detected before each data transfer, before each data block transfer, or only before the transfer of the first piece of data or of the first data block. Further, parameter ctrl-in-trig-mode may also indicate that, for the current transfer parameterized by the content of the register bank associated with the transfer channel, the transfer is not conditioned by the detection of a modification of a signal identified by parameter ctrl-in-trig.

In this embodiment, a data transfer parameterized by the content of the register bank associated with the transfer channel can only start after the reception of the request by the client for a transfer by circuit 14 and, possibly, the detection, by circuit 14, of a modification of the signal identified by parameter ctrl in-trig, the type of the modification being, in this example, indicated by parameter ctrl-in-trig-pol. Further, when the transfer corresponds to a plurality of similar transfers, the beginning of each of the similar transfers may or not be conditioned, in accordance with parameters ctrl-in-trig-mode and/or ctrl-in-req-mode, by the reception of a request originating from the client of the transfer and/or by the detection of a modification of a signal identified by parameter ctrl-in-trig.

In this embodiment, it is further considered that, for each channel, the transfer end event ctrl-out is a modification of a transfer end signal associated with the channel. Event ctrl-out here comprises a parameter ctrl-out-mode representative of the time(s) when the transfer end signal of the channel should be modified, and an optional parameter ctrl-out-pol representative of the modification polarity of the signal, that is, whether the transfer end event is a rising edge, a falling edge, or a change of level of the transfer end signal associated with the considered channel.

As an example, parameter ctrl-out-mode indicates that the time when condition ctrl-out should be generated, that is, the time when the transfer end signal associated with the channel should be modified, occurs only after the transfer of the last piece of data or of the last data block, after the transfer of each piece of data or of each data block, or at no time of the transfer.

As an example, the signal identified by parameter ctrl-in-trig may be the transfer end signal of a channel or any other signal internal to system 1, for example, an event signal supplied by an element of system 1, for example, a counter of system 1.

The examples of embodiments and alternative embodiments described in relation with FIGS. 6 to 10 may be combined, and other variations will occur to those skilled in the art.

In particular, the alternative embodiment described in relation with FIG. 9 applies to the embodiment described in relation with FIG. 10.

In other alternative embodiments, in the same way as a parameter ctrl-in-trig-pol may be provided to indicate which is the type of modification of the signal identified by parameter ctrl-in-trig which conditions data transfers, a parameter ctrl-in-req-pol may be provided to indicate which type of modification of a request signal forms a request from a client associated with the request signal. Further, each of parameters ctrl-in-trig-pol and ctrl-in-req-pol may be representative not only of a given type of modification (rising edge, falling edge, or level change), but also of a high or low level to be detected on the corresponding signal or request. It should be noted that in the absence of parameter ctrl-in-trig-pol and/or of parameter ctrl-in-req-pol, the polarity may be defined by default.

In other alternative embodiments, not detailed, some of parameters ctrl-in-trig, ctrl-in-trig-mode, ctrl-in-trig-pol, ctrl-in-req, ctrl-in-req-mode, ctrl in-req-pol, ctrl-out-mode, and ctrl-out-pol may be omitted. In particular, parameters ctrl-in-trig, ctrl in-trig-mode, ctrl-in-trig-pol, ctrl-out-mode and/or ctrl-out-pol may be provided independently from parameter(s) ctrl-in-req, ctrl-in-req-mode, ctrl-in-req-pol, and conversely.

Although parameters ctrl-in-trig, ctrl-in-trig mode, ctrl-in-trig-pol, ctrl-in-req, ctrl-in-req-mode, ctrl-in-req-pol, ctrl-out-mode and/or ctrl-out-pol are preferably stored in a same register, or in other words originate from a same field of a record of a linked list of records, the parameters may be stored in different registers.

The embodiments of FIGS. 8, 9, and 10 may be implemented without bits U1 to U6. In this case, since there is no conditional update of the registers, each record in the linked list contains as many fields as there are registers.

It can be understood from the above description made in relation with FIGS. 7 to 10 that condition ctrl-in is actually at least partly determined by parameter ctrl-in-req and/or at least partly determined by parameter ctrl-in-trig. Further, the time or the times of detection of a condition ctrl-in, in particular during a transfer corresponding to a plurality of similar transfers, are at least partly determined by parameter ctrl-in-req-mode and/or at least partly determined by parameter ctrl-in-trig-mode.

The method of FIG. 7 and the records described in relation with FIGS. 1 to 5 may be adapted to the embodiments and to the variations described in relation with FIGS. 8, 9, and 10, based on the functional indications given hereabove.

More generally, specific embodiments have been described, those skilled in the art may combine various elements of these various embodiments and variations without showing any inventive step. Further, various alterations and modifications will occur to those skilled in the art. In particular, the number of registers, the number of parameters stored by the register bank, and/or the number of parameters stored by each register, may vary.

Further, other parameters may be provided. For example, in the case of a data transfer by direct memory access, a parameter may indicate whether the data and/or the data blocks of the transfer corresponding to a record should be transferred one by one or in bursts.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electronic system comprising:
    a direct memory access control circuit; and
    a memory storing a linked list that includes a plurality of records, each record of the plurality of records storing a plurality of parameters that parameterize a respective data transfer via the direct memory access control circuit, wherein the plurality of parameters of each record of the plurality of records stores a transfer start condition of the its respective data transfer that determines when to begin its respective data transfer and each record of the plurality of records stores a transfer end event for its respective data transfer that is generated at an end of its respective data transfer, wherein, the plurality of parameters of a first record of the plurality of records identifies a time when the transfer start condition of the respective data transfer of the first record of the plurality of records should be detected or that the transfer start condition of the respective data transfer of the first record of the plurality of records should not be detected.

2. The system of claim 1, wherein, the plurality of parameters of a first record of the plurality of records identifies a client of the respective data transfer of the first record of the plurality of records.

3. The system of claim 2, wherein the transfer start condition of the respective data transfer of the first record of the plurality of records is at least partly determined by the client of the respective data transfer of the first record of the plurality of records.

4. The system of claim 1, wherein, the plurality of parameters of a first record of the plurality of records comprises a transfer start signal, the transfer start condition of the respective data transfer of the first record of the plurality of records being at least partly determined by the transfer start signal of the first record of the plurality of records.

5. The system of claim 1, wherein, the plurality of parameters of a first record of the plurality of records further identifies a time when the transfer end event of the respective data transfer of the first record of the plurality of records should be generated or the transfer end event of the respective data transfer of the first record of the plurality of records should not be generated.

6. The system of claim 5, wherein the transfer end event of the first record of the plurality of records is a modification of a transfer end signal.

7. The system of claim 1, wherein a first record of the plurality of records comprises a plurality of fields and the direct memory access control circuit comprises a register bank comprising a plurality of registers, each register of the register bank being programmed with a content stored in a corresponding field of the plurality of fields of the first record of the plurality of records before the respective data transfer of the first record of the plurality of records begins on the direct memory access control circuit; and wherein a second record of the plurality of records comprises a number of fields determined by a value of a first field of the plurality of fields of the first record of the plurality of records.

8. The system of claim 7, wherein a content of each field of the number of fields of the second record of the plurality of records is programmed in an associated register of the register bank before the respective data transfer of the second record of the plurality of records begins on the direct memory access control circuit, and wherein the associated register of each field of the number of fields of the second record of the plurality of records is determined by the value of the first field of the first record of the plurality of records.

9. The system of claim 8, wherein the first field of the plurality of fields of the first record of the plurality of records comprises bits, and wherein each of the bits identifies a register of the register bank and the values of the bits determine the associated register of each field of the number of fields of the second record of the plurality of records.

10. The system of claim 1, wherein the plurality of parameters of a first record of the plurality of records indicates whether the respective data transfer of the first record of the plurality of records comprises a transfer of a piece of data, a transfer of a plurality of data, a transfer of a data block, or a transfer of a plurality of data blocks.

11. The system of claim 10, wherein the plurality of parameters of the first record of the plurality of records identifies a time when the transfer start condition of the respective data transfer of the first record of the plurality of records should be detected or that the transfer start condition of the respective data transfer of the first record of the plurality of records should not be detected, the time when the transfer start condition of the respective data transfer of the first record of the plurality of records should be detected being selected from a group consisting of: before each data transfer of a plurality of data transfers, only before the transfer of a first piece of data of a plurality of pieces of data, before the transfer of each data block of a plurality of data blocks, or only before the transfer of a first data block.

12. A memory comprising a linked list that includes a plurality of records, each record of the plurality of records storing a plurality of parameters that parameterize a respective data transfer via a direct memory access control circuit wherein the plurality of parameters of each record of the plurality of records stores a transfer start condition of its respective data transfer that determines when to begin its respective data transfer and a transfer end event for its respective data transfer generated at an end of the respective data transfer, wherein the plurality of parameters of a first record of the plurality of records identifies a time when the transfer end event of the respective data transfer of the first record of the plurality of records should be generated or that the transfer end event of the respective data transfer of the first record of the plurality of record should not be generated.

13. The memory of claim 12, wherein the plurality of parameters of a first record of the plurality of records identifies a client of the respective data transfer of the first record of the plurality of records.

14. The memory of claim 13, wherein the transfer start condition of the respective data transfer of the first record of the plurality of records is at least partly determined by the client of the respective data transfer of the first record of the plurality of records.

15. The memory of claim 12, wherein, the plurality of parameters of a first record of the plurality of records comprises a transfer start signal, the transfer start condition of the respective data transfer of the first record of the plurality of records being at least partly determined by the transfer start signal of the first record of the plurality of records.

16. The memory of claim 12, wherein, the plurality of parameters of a first record of the plurality of records further identifies a time when the transfer start condition of the respective data transfer of the first record of the plurality of records should be detected or that the transfer start condition of the respective data transfer of the first record of the plurality of records should not be detected.

17. The memory of claim 12, wherein a first record of the plurality of records comprises a plurality of fields and the direct memory access control circuit comprises a register bank comprising a plurality of registers, each register of the register bank being programmed with a content stored in a corresponding field of the plurality of fields of the first record of the plurality of records before the respective data transfer of the first record of the plurality of records begins on the direct memory access control circuit; and wherein a second record of the plurality of records comprises a number of fields determined by a value of a first field of the plurality of fields of the first record of the plurality of records.

18. The memory of claim 12, wherein the plurality of parameters of a first record of the plurality of records indicates whether the respective data transfer of the first record of the plurality of records comprises a transfer of a piece of data, a transfer of a plurality of data, a transfer of a data block, or a transfer of a plurality of data blocks.

19. A method of operating a system comprising a first component and a second component, the method comprising:
    performing a first data transfer from the first component to the second component by direct memory access, wherein the first data transfer is performed on a channel of a direct memory access control circuit, the first data transfer on the channel of the direct memory access control circuit being parameterized by a plurality of parameters of a first record of a plurality of records of a linked list stored in a memory, wherein the plurality of parameters of the first record comprises a transfer start condition of the first data transfer that determines when to begin the first data transfer and a transfer end event of the first data transfer generated at an end of the first data transfer, the direct memory access control circuit comprising a register bank associated with the channel of the direct memory access control circuit, the plurality of Parameters of the first record being stored on the register bank before the first data transfer is performed on the channel of the direct memory access control circuit; and performing a second data transfer on the channel of the direct memory access control circuit, the second data transfer on the channel of the direct memory access control circuit being parameterized by a plurality of parameters of a second record of the plurality of records of the linked list stored in the memory, wherein the plurality of parameters of the second record comprises a transfer start condition of the second data transfer that determines when to begin the second data transfer and a transfer end event of the second data transfer generated at an end of the second data transfer, wherein the plurality of parameters of the second record is stored on the register bank before the second data transfer is performed on the channel of the direct memory access control circuit.

20. The method of claim 19, wherein each record of the plurality of records comprises a corresponding plurality of parameters that parameterize a corresponding data transfer on the channel of the direct memory access control circuit, and wherein for each record of the plurality of records a current content of the register bank is updated with the corresponding plurality of parameters of the record before the corresponding data transfer of the record is performed on the channel of the direct memory access control circuit.

21. The method of claim 20, wherein, for each record of the plurality of records, the corresponding data transfer of the record starts after a corresponding transfer start condition of the corresponding plurality of parameters of the record is detected.

22. The system of claim 1, wherein the respective data transfer for each record begins after the transfer start condition for the respective data transfer has been fulfilled and the respective data transfer for each record terminates before or at a time of the transfer end event.

23. The system of claim 1, wherein a first record of the plurality of records comprises a plurality of fields and the direct memory access control circuit comprises a register bank comprising a plurality of registers, each register of the register bank being programmed with a content stored in a corresponding field of the plurality of fields of the first record of the plurality of records before the respective data transfer of the first record of the plurality of records begins on the direct memory access control circuit.

* * * * *